United States Patent [19]

Nekula

[11] 4,004,941

[45] Jan. 25, 1977

[54] CLEANING METHOD FOR AUTOMATIC DOCUMENT HANDLER

[75] Inventor: Ronald M. Nekula, Rochester, N.Y.

[73] Assignee: Xerox Corporation, Stamford, Conn.

[22] Filed: Sept. 19, 1975

[21] Appl. No.: 615,010

[52] U.S. Cl. .................................. 134/15; 134/42; 198/495; 271/4

[51] Int. Cl.² .......................................... B08B 3/08

[58] Field of Search ............... 134/15, 42; 198/230; 271/4; 427/322, 387

[56] References Cited

UNITED STATES PATENTS

| | | | |
|---|---|---|---|
| 3,506,257 | 4/1970 | Fackler et al. | 271/4 X |
| 3,718,588 | 2/1973 | Bellos et al. | 252/32.5 |
| 3,747,918 | 7/1973 | Margulis et al. | 271/4 |
| 3,815,896 | 6/1974 | Hoyer | 271/4 |

OTHER PUBLICATIONS

Kirk–Othmer, *Encyclopedia of Chem. Tech.*, vol. 12, 1954, pp. 400–403.

*Primary Examiner*—S. Leon Bashore
*Assistant Examiner*—Marc L. Caroff

[57] ABSTRACT

The platen belt on an automatic document handler is treated to minimize the variation in frictional characteristics between a dirty belt and a clean belt by applying silicone oil to the belt after it has been cleaned with solvent.

3 Claims, 2 Drawing Figures

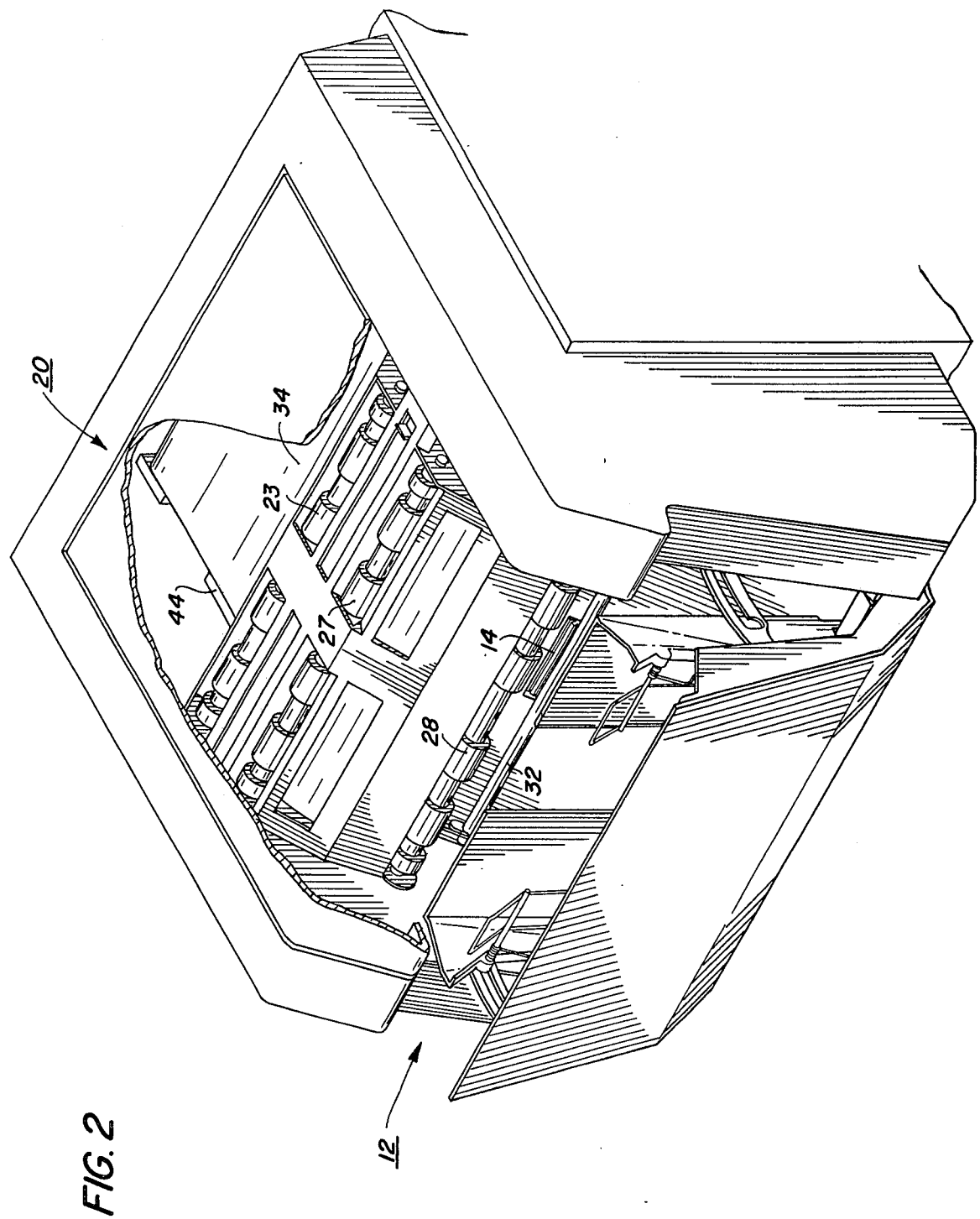

CLEANING METHOD FOR AUTOMATIC DOCUMENT HANDLER

BACKGROUND OF THE INVENTION

With the advent of high speed copiers, such as xerographic reproduction machines, automatic document handlers have been developed to rapidly place and remove documents from the platen of the copy machine to enable the machine to produce copies at its full potential. Following separation of the document to be copied from the remainder of the documents awaiting copying, the separated document must be brought into position on the machine platen and located in a certain position to assure the making of a complete and visually acceptable copy. To assure that the document is positively driven onto the platen of the copy machine and accurately located thereon, a platen belt overlying the entire platen area may be utilized. To prevent printing of "black borders" due to copying documents on larger size sheets than the original document, the platen belt is ordinarily formed of a white material to enable discharge of the photoconductive surface in the border areas and thereby prevent printing the black borders on the finished copy.

In positioning the document on the platen, it is common to drive the document onto the platen and thereafter reverse the belt movement to drive the document into a registration edge to assure accurate positioning of the document. In driving the documents against the stationary registration edge, the normal force between the belt and the document and the frictional force therebetween must be carefully controlled to prevent jamming of the document against the registration edge and wrinkling or otherwise damaging the lead edge of the document.

After the document handler has been in use for a certain number of cycles, the white surface of the belt becomes soiled, either with ink material picked up from the back side of the documents being copied or by normal dust that may settle on the glass when the platen belt is moved away from the platen for access thereto. When the platen belt surface becomes soiled, the soil marks may be printed through on the final copy, resulting in an unacceptable "dirty" copy. As such, the machine operator periodically must clean the platen belt to restore the white reflective surface desired.

However, immediately after cleaning the belt surface, the coefficient of friction of the surface is maximized. As the belt is used, the coefficient of friction drops to a lower level. Since the coefficient of friction reaches this lower level a short period of time after the cleaning operation has been performed, the belt material and the normal forces are ordinarily selected in the design of an automatic document handler utilizing this lower coefficient of friction. However, because of the higher frictional characteristics obtained immediately after cleaning, it has been found that document damage may occur upon reversal of the platen belt when driving the document against the cooperating registration edge.

It is therefore an object of this invention to provide a method for treating automatic document handler belts which provides a reduced belt coefficient of friction immediately after the belt has been cleaned to allow immediate use of the reproduction machine and assure proper document handling.

SUMMARY OF THE INVENTION

This invention relates to a method for cleaning and treating the automatic document handler platen belt in an automatic copying machine including the steps of cleaning the belt with a suitable cleaning solvent and thereafter treating the cleaned belt surface with a predetermined quantity of silicone oil to reduce the coefficient of friction of the newly cleaned belt to a level substantially lower than that obtained by the cleaning operation.

BRIEF DESCRIPTION OF THE DRAWINGS

FIG. 2 is a perspective view of the document handler illustrated in FIG. 1.

DESCRIPTION OF THE PREFERRED EMBODIMENT

Figure 1:
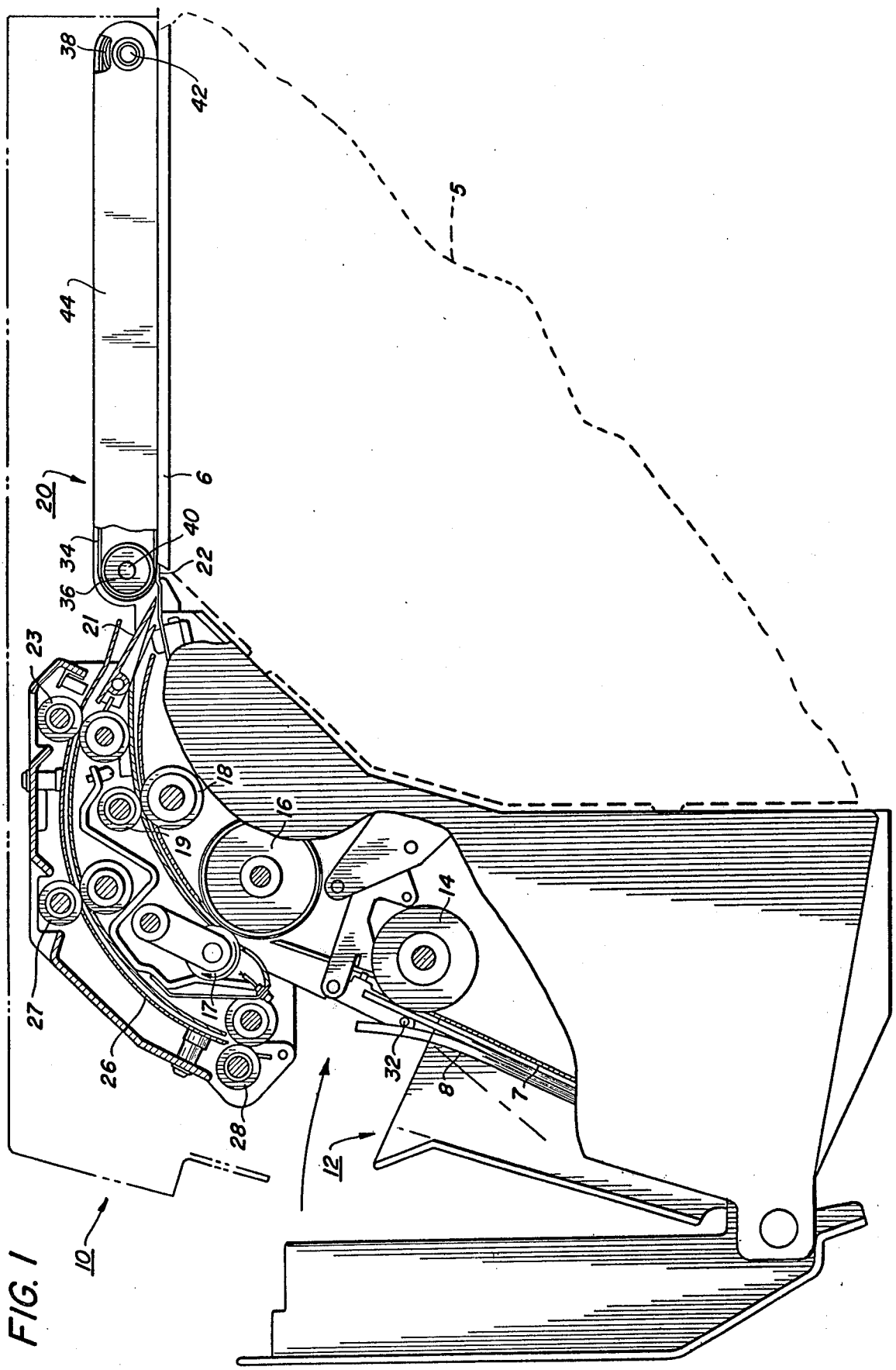
FIG. 1 is a side view in cross-section showing a document handler incorporating a document belt forming the subject of the present invention.

Referring to the drawings, there is shown a document handler designated generally by the numeral 10 incorporating the platen transport of the present invention. Document handler 10 may be used with any suitable document processing apparatus, such as a reproduction machine 5, which has a platen 6 on which the document to be copied is placed. Document handling apparatus 10 includes a supply tray 12 for storing both documents 7 to be copied and documents 8 already copied. From tray 12, one document at a time is advanced from the bottom of supply 7 by an intermittently operated primary feed roll 14 into the nip of retard roll pair 16, 17. The lower roll 16 is driven in a document feeding direction while the upper roll 17 is driven in the reverse or document reject direction (as shown by the arrow in FIG. 1) through a suitable slip coupling which normally enables the lower roll 16 to override the reverse drive input to roll 17 and thereby turn roll 17 in the document feeding direction. However, if two or more documents enter the nip of roll pair 16, 17, the reduced friction between the overlapping documents reduces the frictional drive force between roll pair 16, 17, permitting the slip clutch to engage and drive roll 17 in the reverse, document rejecting direction.

The document emerging from retard roll pair 16, 17 passes into the nip of intermediate roll pair 18, 19, and from there underneath deflector plate 21 to platen transport 20. Transport 20, which comprises a belt-type conveyor, first carries the document forward onto platen 6 until the entire document is positioned thereon. Transport 20 is then reversed to bring the document trailing edge against register 22. Register 22 locates the document in copying position following which the copy or copies are made by the copying apparatus 5.

When copying is completed, platen transport 20 is again started in reverse to move the document backwards off platen 6, register edge 22 being previously retracted for this purpose. Deflector 21, which was previously lowered, guides the returning document upwardly into the nip of return roll pair 23. Roll pair 23 moves the document along suitable return guides 26 through second and third return roll pairs 27, 28 respectively, and back into tray 12.

To maintain copied documents which have been designated for convenience by the numeral 8, segregated from documents 7 awaiting copying, and prevent inadvertent or premature refeeding of the returned documents 8 by feed foll 14 following feed of the last one of the documents 7, a displaceable bail or separator bar 32 is provided. Bail 32 is disposed substantially opposite to and above primary feed roll 14 to prevent documents resting thereon from contacting roll 14. Bail 32 may be reset onto the top of the documents in tray 12 when it is desired to refeed the documents to copying machine 5. For a complete description of mechanisms suitable for moving the bail bar 32, register 22, and deflector 21, reference may be had to U.S. Pat. application Ser. No. 250,905 filed May 8, 1972 now U.S. Pat. No. 3,941,376 and assigned to the same assignee as the instant invention.

Referring particularly to FIG. 2, platen transport 20 consists of an endless, flexible belt 34, the outer surface of which is light reflective. One such belt construction is disclosed in U.S. Pat. No. 3,482,676 to G. E. Fackler. Platen belt 34 is stretched about drive and idler roll pair 36 and 38 respectively, rolls 36 and 38 being arranged on opposite sides of platen 6 with the axis of roll 36 being above register 22 while that of roll 38 only a small side portion of which is visible in FIG. 1 is above the far side of platen 6. Roll shafts 40 and 42 are rotatably supported in sides 44 of the platen transport 20.

As stated heretofore the platen transport belt must drive the document onto the platen glass, register the document, and then drive the document off the glass. In order to register the document, it is driven against the registration edge 22 by belt 34. When the document hits this edge, the belt must slip on the document or a malfunction will result.

After a predetermined number of document recirculation cycles, the platen belt becomes sufficiently "dirty" to cause printing, on the finished copy, of markings corresponding to the dirt markings on the belt surrounding the document. Depending on machine usage, it may be necessary to clean the platen belt two or three times a day. After cleaning, the driving force of the belt on the paper is often sufficient to cause the document to either buckle and go over the registration edge or to slide underneath the registration edge, either situation being capable of causing document destruction. The tendency for documents to behave in this manner can be mitigated by optimizing other parameters such as registration edge angle and belt normal force on the platen glass; however, optimization of these parameters can be effectively negated by excessively high document drive forces caused by a high belt coefficient of friction resulting from the belt cleaning operation.

To overcome these difficulties, the belt may be cleaned with a suitable cleaning fluid such as a solution containing tergitol 15S9, sodium xylene sulfonate, propasol B, tetra potassium pyrophosphate and lemon oil in an isopropanol base. While this cleaning solution is preferred, straight isopropanol may be utilized to clean the belt, which in the disclosed document feeder is made of synthetic rubber. Following cleaning with the solution or isopropanol, the coefficient of friction of the belt is maximized. It has been found that by allowing the belt to "age" for approximately 30 minutes, the coefficient of friction will drop to a more reasonable level. However, in the operation of a reproduction machine, it is not often possible to allow the machine to remain idle for this period of time. The belt surface may therefore be "artificially contaminated" or aged with a material such as silicone oil to immediately reduce the coefficient of friction. With the disclosed platen belt, it has been found that a polyurethane pad impregnated with approximately three drops of silicone oil, if rubbed over the entire surface of the belt, willl sufficiently reduce the coefficient of friction thereof to prevent document damage while at the same time providing insufficient oil on the belt to cause oil deposits on the documents being handled thereby. To prevent any errors in the "contamination" operation by the machine operator, pre-packaged pads having the required amount of silicone oil thereon may be provided to the operator, which pads would be disposed of after each cleaning operation. As an unexpected side effect, it has been found that platen belt life may be doubled by this treatment.

The following chart gives the registration drive force in pounds measured both dynamically and statically with various brands of paper for a dirty belt, for a cleaned belt immediately after the cleaning operation, and for a belt cleaned and treated in accordance with the present invention. The chart clearly illustrates the drastic reduction in drive force variations between a dirty belt and a cleaned and treated belt.

| Paper | REGISTRATION DRIVE FORCE, IN POUNDS, DYNAMICALLY AND STATICALLY | | | | | | | |
|---|---|---|---|---|---|---|---|---|
| | Xerox 4024 | | IBM | | Permanent Record | | Racerase | |
| FORCES | DYN. | STATIC | DYN. | STATIC | DYN. | STATIC | DYN. | STATIC |
| Dirty Belt | .01 | | .012 | | .008 | | .005 | |
| Cleaned Belt | .02 | .12 | .04 | .15 | .04 | .26 | .025 | .20 |
| Cleaned and Treated | .006 | .05 | .007 | .04 | .005 | .06 | .004 | .04 |

While with the disclosed belt, which has a total surface area of 345 square inches, it has been suggested that a polyurethane pad impregnated with three drops of silicone oil be utilized, it is obvious that the quantity of oil in the pad should be increased or decreased depending upon the surface area of the platen belt utilized with the particular document feeder.

While I have disclosed a preferred embodiment of my invention, it is to be understood that the invention may be otherwise embodied within the scope of the following claims.

What is claimed is:
1. In a document handling process in which a platen belt transports a document to be copied onto a stationary exposure platen against a registration edge associated with the platen to register the document thereon, the improvement for treating the platen belt to minimize the variation in frictional characteristics between a dirty belt and a clean belt comprising the steps of:

cleaning the surface of the belt which contacts the document to be copied with a solvent; and, applying silicone oil to the cleaned surface of the belt in an amount sufficient to reduce the coefficient of friction of the cleaned surface to substantially the same coefficient of friction existing on the surface prior to said cleaning step.

2. A process according to claim 1 wherein said solvent has an isopropanol base.

3. A process according to claim 1 wherein the amount of silicone oil applied is approximately one drop of oil for each 115 square inches of belt surface.

* * * * *